(12) United States Patent  (10) Patent No.: US 8,856,775 B2
Joukov et al.  (45) Date of Patent: Oct. 7, 2014

(54) UNSTACKING SOFTWARE COMPONENTS FOR MIGRATION TO VIRTUALIZED ENVIRONMENTS

(75) Inventors: Nikolai Joukov, Thornwood, NY (US); Matthew Markley, Hays, KS (US); Birgit Pfitzmann, Valhalla, NY (US); Michael Tacci, Downingtown, PA (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 12/888,032

(22) Filed: Sep. 22, 2010

(65) Prior Publication Data
US 2012/0072709 A1  Mar. 22, 2012

(51) Int. Cl.
G06F 9/44 (2006.01)
G06F 15/177 (2006.01)
G06F 9/46 (2006.01)
G06F 9/50 (2006.01)
G06F 9/455 (2006.01)

(52) U.S. Cl.
CPC .... G06F 9/45558 (2013.01); *G06F 2009/4557* (2013.01); G06F 9/5077 (2013.01)
USPC ............ 717/172; 709/221; 718/104; 718/105

(58) Field of Classification Search
USPC ......................................................... 717/172
See application file for complete search history.

(56) References Cited

U.S. PATENT DOCUMENTS

| 6,061,711 | A  | * | 5/2000  | Song et al. ................... 718/108 |
| 6,125,387 | A  | * | 9/2000  | Simonoff et al. ............. 709/218 |
| 6,622,259 | B1 | * | 9/2003  | Schmuck ..................... 714/4.21 |
| 7,451,443 | B2 | * | 11/2008 | Lowell et al. ..................... 718/1 |
| 7,886,036 | B2 | * | 2/2011  | Ardagna et al. .............. 709/223 |
| 7,970,903 | B2 | * | 6/2011  | Oeda ............................. 709/226 |
| 8,280,944 | B2 | * | 10/2012 | Laadan et al. ................ 709/202 |
| 2003/0229890 | A1 | * | 12/2003 | Lau et al. ...................... 717/168 |
| 2004/0025161 | A1 | * | 2/2004  | Chauvel et al. .............. 718/102 |
| 2004/0111725 | A1 | * | 6/2004  | Srinivasan et al. ........... 718/105 |
| 2007/0028244 | A1 | * | 2/2007  | Landis et al. ................. 718/108 |
| 2007/0245334 | A1 | * | 10/2007 | Nieh et al. .................... 717/168 |
| 2007/0250838 | A1 | * | 10/2007 | Belady et al. ................. 718/105 |
| 2009/0144393 | A1 | * | 6/2009  | Kudo ............................ 709/218 |
| 2009/0300149 | A1 | * | 12/2009 | Ferris et al. .................. 709/222 |
| 2011/0208808 | A1 | * | 8/2011  | Corbett ........................ 709/203 |

OTHER PUBLICATIONS

U.S. Appl. No. 12/511,506, filed Jul. 29, 2009, titled Efficient Extraction of Software Dependencies from Program Code.
IBM Migration Factory. http://www-03.ibm.com/systems/migratetoibm/factory/, Printed Sep. 22, 2010.
Joukov et al., Application-Storage Discovery, SYSTOR 2010, Haifa, May 2010.

(Continued)

*Primary Examiner* — James D Rutten
(74) *Attorney, Agent, or Firm* — Ryan, Mason & Lewis, LLP

(57) ABSTRACT

Techniques for unstacking software components are provided. The techniques include discovering a plurality of software components and one or more dependencies between the software components in a computer system, designing a plurality of unstacking options for unstacking said components, and selecting one of said unstacking options to unstack said components.

19 Claims, 8 Drawing Sheets

(56) References Cited

OTHER PUBLICATIONS

Joukov et al., ITBVM: IT Business Value Modeler, IEEE International Conference on Services Computing (SCC 2009), Bangalore, Sep. 2009, Second International Workshop on Statistical and Computational Theories of Vision—Modeling, Learning, Computing, and Sampling, Canada, Jul. 2001.

Cirba, http://www.cirba.com/, Printed Sep. 22, 2010.

U.S. Appl. No. 12/553,486, filed Sep. 3, 2009, titled A Method and System to Discover Possible Program Variable Values by Connecting Program Value Extraction with External Data Sources.

U.S. Appl. No. 12/608,609, filed Oct. 29, 2009, titled Assisting Server Migration.

\* cited by examiner

UNSTACKING SOFTWARE COMPONENTS FOR MIGRATION TO VIRTUALIZED ENVIRONMENTS

FIELD OF THE INVENTION

The present invention relates to the electrical, electronic and computer arts, and, more particularly, to information technology (IT) and the like.

BACKGROUND OF THE INVENTION

Most existing migration and server consolidation considers entire images, that is, all software running on a physical server or in a virtual partition or virtual machine as a whole. Such approaches aim to deploy these images on fewer servers, typically virtualized, while fulfilling the resource requirements of all of the images. An image may contain one or more key software components. A key software component can include, for example, a web server, an application server, a database server, the individual code modules in the application server, the individual databases in the database server, etc. An image may also be used in one or more enterprise applications. An enterprise application might include, for example, a travel expense application, a product web catalogue, a computer-aided manufacturing application, etc. (that is, a larger IT entity, including one or more interacting software components, that fulfils overall requirements and has to be operational as a whole). Existing approaches, however, lack techniques for migration and other transformation cases to split up different software components that were running on one image (this is also referred to herein as unstacking).

SUMMARY OF THE INVENTION

Principles of the invention provide techniques for unstacking software components, typically for migration to virtualized environments. In one aspect, an exemplary method includes the steps of discovering a plurality of software components and one or more dependencies between the software components in a computer system, designing a plurality of unstacking options for unstacking said components, and selecting one of said unstacking options to unstack said components.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:
  more uniform images after unstacking, by ending up with one key software component per image;
  simpler management after unstacking, by ending up with one key software component per image;
  future changes are easier on images with single software components (for example, further migration, in particular in live-migration scenarios);
  increasing the range of client environments that can be migrated to efficient cloud usage; and
  separating software components by enterprise applications (for example, for when a company splits up, or when a company wants to separate its enterprise applications for financial, auditing, regulatory compliance, or security reasons).

These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

Figure 1:
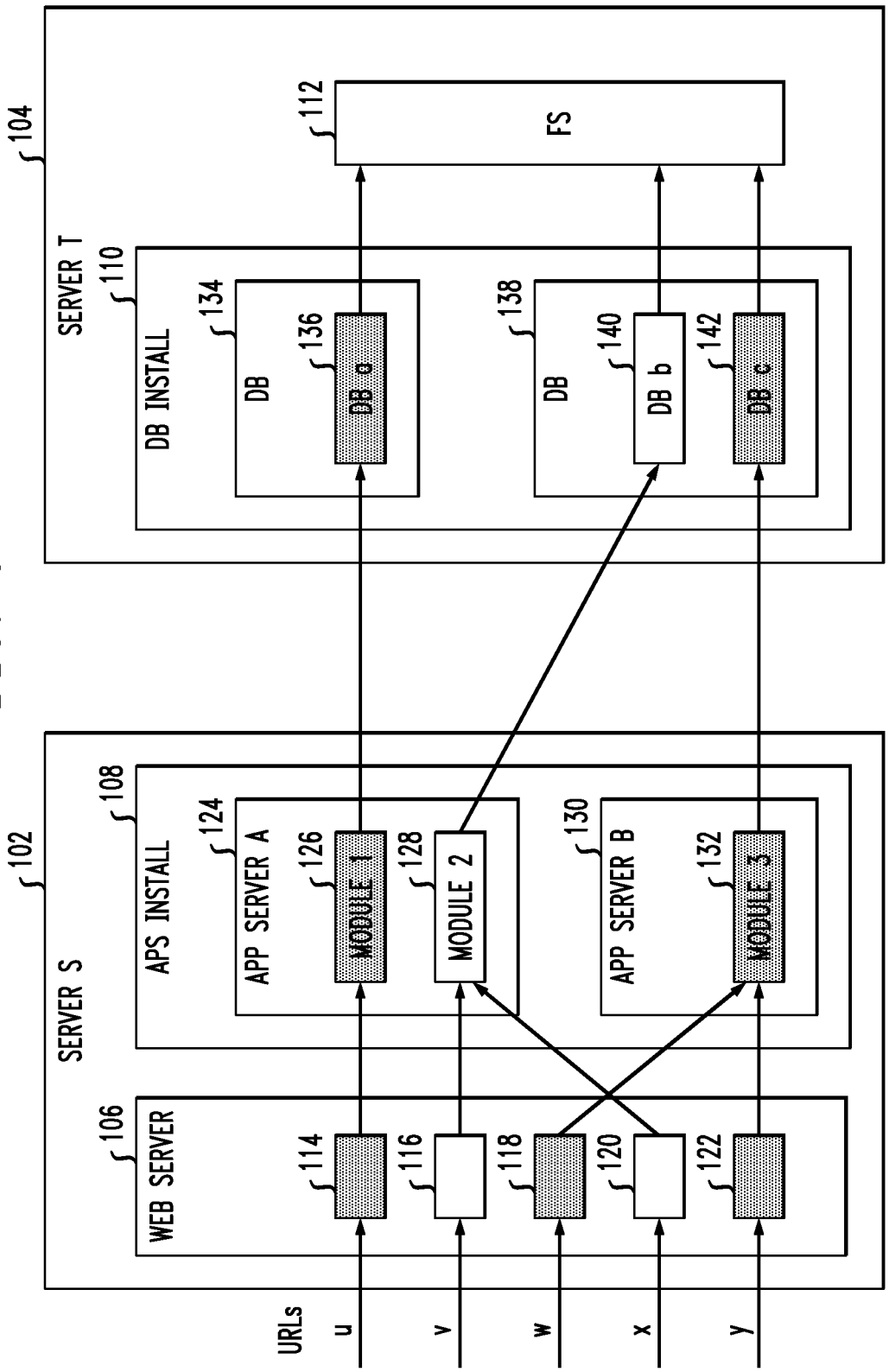
FIG. 1 shows an example of stacked applications, which may be addressed with one or more embodiments of the invention.

Principles of the present invention include providing enterprise support as a service. As used herein, "stacked" software components indicate several software components that are running on the same server or virtual image. The stacked software components may support one or more enterprise applications. For instance, several databases hosted in the same database server instance may belong to different enterprise applications, or different enterprise java beans hosted in the same application server may belong to different enterprise applications. As also used herein, "unstacking" indicates taking such software components apart so that they no longer run on the same server or virtual image. One typical goal of unstacking, for example, is to separate the software components according to the enterprise application, that is, after the unstacking, each server or virtual image will serve only one enterprise application. Another typical goal of unstacking is to separate the software components so that after unstacking there is only one key software installation or instance on each server or virtual image.

As described herein, one or more embodiments of the invention result in producing one key software component per image. This is of particular benefit if a cloud is a potential goal of the migration or transformation, as clouds gain much of their cost efficiencies from uniformity of images. Additionally, platform-as-a-service clouds can even come with a set of preconfigured images with one or a small number of software components.

Additionally, one or more embodiments of the invention include facilitating simpler management after unstacking because of achieving one key software component per image. For instance, such an image can be managed primarily as a database server, or an application server. Consequently, all users and security settings on this image belong to just this key software component, and all storage or performance problems are likely due to that software component, etc. Accordingly, such management tasks can be more easily handled. Simpler user and security management may also result, for example, if one unstacks by enterprise application rather than by software components.

As noted, in traditional migration, a typical approach is to migrate individual operating system images, and the goal is either to simply move them (for example, to newer hardware) or to consolidate them, typically by virtualization and putting several images on the same physical server.

One or more embodiments address a migration use case wherein initially several software components are stacked on one operating system image, and the goal is to separate them and put each one, or certain subsets of them, on different physical or virtual machines. This is referred to herein as "unstacking." It is believed that unstacking may be particularly suitable for use in connection with cloud computing. Advantages of unstacking, which may be realized in one or more embodiments, include more uniform images, simpler management, and that future changes are easier on unstacked images (for example, further migration, in particular in live-migration scenarios).

Applicability of unstacking has arisen with the advent of virtualization and clouds. In the past, with physical servers, stacking software often made the best use of hardware, because there are relatively few available hardware sizes and fully utilizing existing servers was a key cost driver. Also, in early times of virtualization, server utilization was still a key driver and corresponding migration focused on physical-to-virtual transformation and putting several entire images onto one physical server. Now, that server utilization has largely become optimized due to virtualization, in particular with novel cloud environments, and the management cost and simplicity become a quite significant factor. Furthermore, IT management costs have generally become a dominant cost type in overall IT costs.

In existing approaches, migration is essentially always a one-to-one mapping or a consolidation, n-to-one. In one or more instances addressed by one or more embodiments of the invention, there are many servers, logical partitions (LPARs), and virtual machine images that contain several software components (for example, both IBM WEBSPHERE APPLICATION SERVER (WAS) software and IBM DB2 database software (both available from International Business Machines Corporation, Armonk, N.Y., USA)), or several database installs or instances belonging to different enterprise applications. This type of arrangement is referred to as "stacked." Note that the specific IBM software mentioned is purely for purposes of illustration and not limitation. An LPAR is a subset of computer's hardware resources, virtualized as a separate computer (as will be appreciated by the skilled artisan), and a physical machine can be partitioned into multiple LPARs, each housing a separate operating system.

With the increasing flexibility of image sizes and placement as offered by virtualization and in particular cloud computing, it may be beneficial to separate such software components again, because management of images with many software components, often belonging to more than one enterprise application, is typically considerably more challenging than managing simpler images. This aspect is referred to herein as "unstack."

Advantageously, one or more embodiments of the invention provide techniques for automated unstacking methods or systems, and are not limited to treating entire images. In one or more embodiments, unstacking techniques make use of module-level dependency discovery. By way of example only, carrying out such discoveries can be performed using techniques such as those detailed in, Joukov et al., "ITBVM: IT Business Value Modeler," IEEE International Conference on Services Computing (SCC 2009), Bangalore, September 2009, and in Joukov et al., "Application-Storage Discovery," SYSTOR 2010, Haifa, May 2010, and in U.S. patent application Ser. No. 12/511,506, filed on Jul. 29, 2009 and U.S. patent application Ser. No. 12/553,486, filed on Sep. 3, 2009.

One or more embodiments advantageously significantly increase the range of client environments that can be migrated to efficient cloud usage. In at least some instances of the invention, it is expected that a migration request for a stacked image will also lead to unstacked proposals.

Reference should now be had to FIG. 1, which provides a non-limiting example of stacked applications that can be addressed by one or more embodiments of the invention. There are two servers, Server S, numbered 102, and Server T, numbered 104. A web server 106 and an application server installation (APS) 108 are stacked on Server S. A database (DB) installation 110 and the file system (FS) 112 supporting the actual data are stacked on Server T. Web server 106 hosts uniform resource locators (URLs) 114, 116, 118, 120, and 122, also designated as u, v, w, x, and y, respectively. Multiple application servers (App server A, numbered 124, and App server B, numbered 130) are stacked on APS 108. App server A includes modules 126 and 128, while App server B includes module 132. Multiple database instances 134, 138 are stacked in the database installation 110 in Server T. Instance 134 includes database a, numbered 136, while instance 138 includes database b, numbered 140, and database c, numbered 142.

URLs 114, 118, and 122, Module 1 numbered 126, Module 3 numbered 132, and database a numbered 136 and database c numbered 142 represent a first enterprise application. URLs 116 and 120, Module 2 numbered 128, and database b numbered 140 represent a second, different enterprise application. Thus, it can be said that in one dimension, these two enterprise applications are stacked on Servers S and T. In another dimension, it can be said that a web server 106 and an application server (APS) installation 108 are stacked on server S, and that a database (DB) installation 110 and the file system 112 supporting the actual data are stacked on Server T. It can also be said that multiple application servers 124, 130 are stacked in Server S, and multiple database instances 134, 138 in Server T.

As detailed herein, taking software components apart is at least an option in unstacking migration, in accordance with one or more embodiments of the invention. FIGS. 2 through 5 depict examples of unstacking options (using many of the same numbered components as depicted in FIG. 1).

Figure 2:
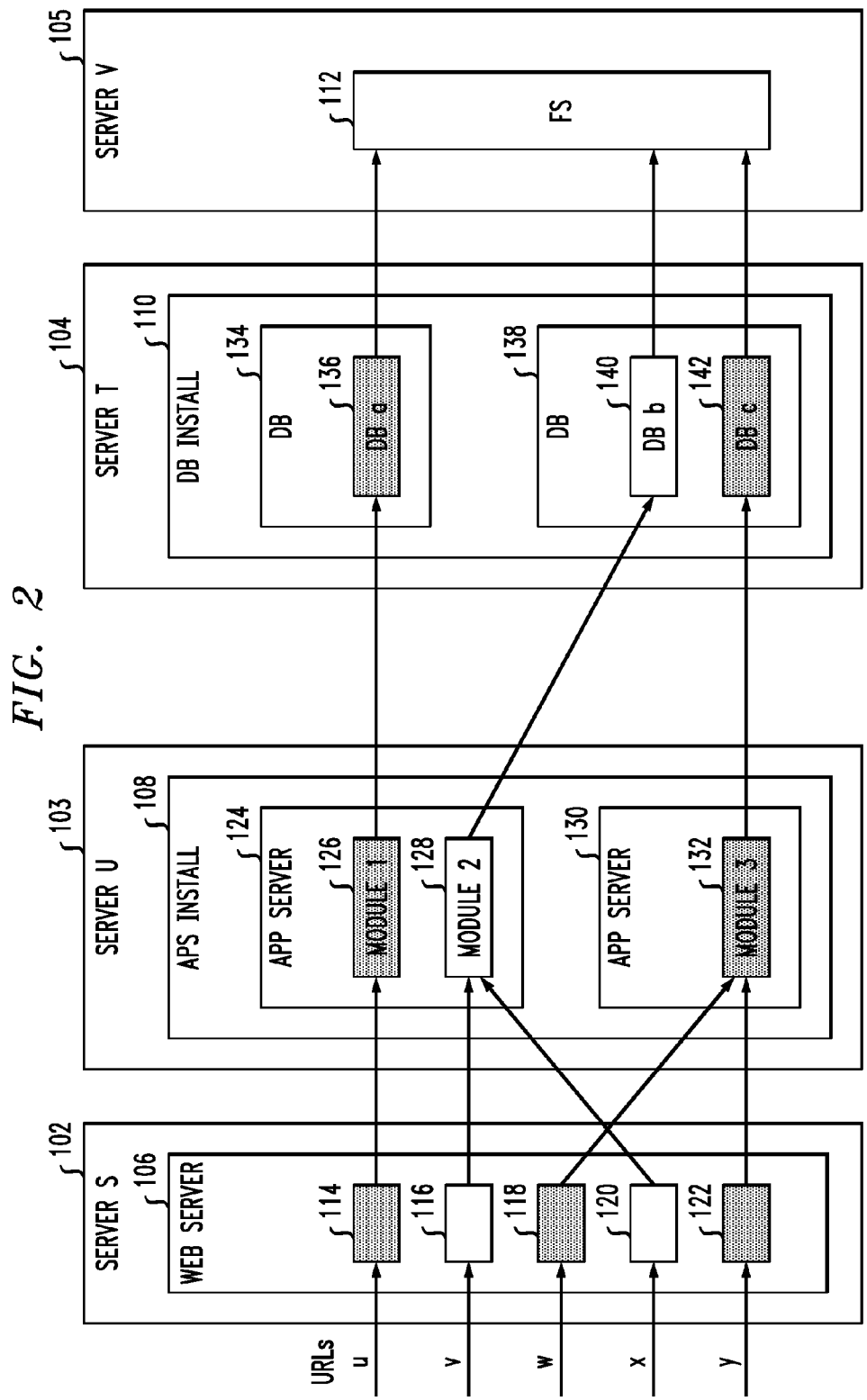
FIG. 2 shows an example of unstacking options, according to one or more embodiments of the invention.

In FIG. 2, unstacking is done along the dimension of key software components (which are further described herein). Thus, web server 106, application server installation APS 108, DB install 110, and files system 112 each run on a different image (typically virtual) after the unstacking. These images are denoted Server S 102, Server U 103, Server T 104, Server V 105 in FIG. 2. Note that all servers will still have some file systems, but this particular example considered only those parts of the overall file systems to be key software components that hold the key application data, which are stored in the databases.

Retaining the names and numbers of servers S 102 and T 104 (and thus indicating that these are the same servers as in the pre-migration state in FIG. 1) is only one example of realizing unstacking in the dimension of key software components. It indicates that the application server installation APS 108 and the file system 112 may be removed from these servers or virtual images and moved to new servers or virtual images. Alternatively, new servers or images may also be used for the web server 106 and for the DB install 110, for instance, because one may also want to virtualize them, use a smaller image, or newer hardware.

Figure 3:
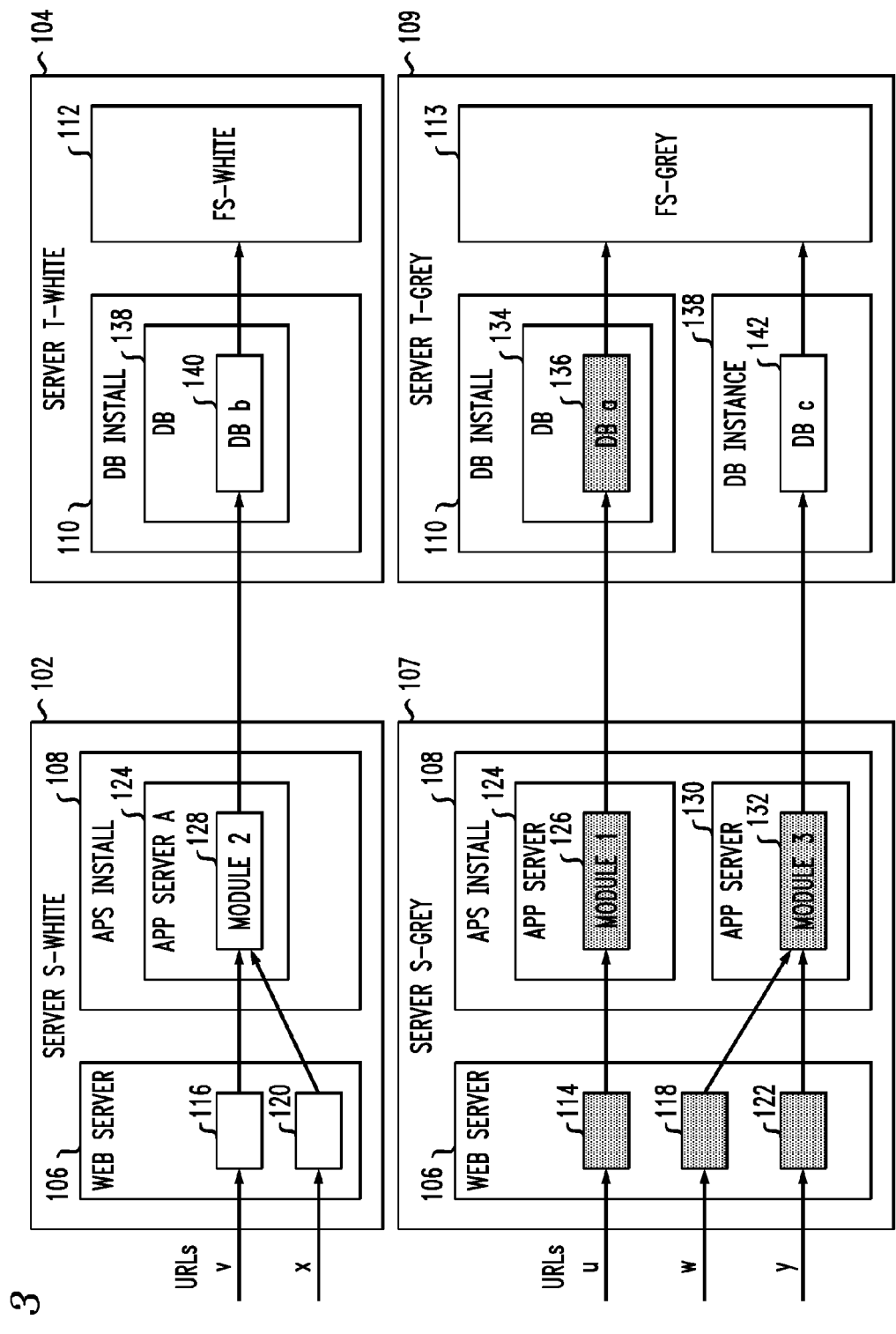
FIG. 3 shows an example of unstacking options, according to one or more embodiments of the invention.

In FIG. 3, unstacking is done along the dimension of enterprise applications. By way of illustration, in the example of a travel application, and considering the "white" enterprise application in FIG. 1, the two URLs might be the URLs for the traveler and the approver, respectively, where the application server Module 2 handles the approval workflow logic, and the database DB b contains current and past travel applications as well as general information such as preferred airlines and maximum allowed prices. In FIG. 3, the "white" enterprise application and the "grey" enterprise application are moved to different servers, which are denoted in FIG. 3 as S-white 102, T-white 104, S-grey 107, and T-grey 109 (which includes, for example, file system grey 113). Note that at the level of detail of knowledge shown about the software components and what enterprise applications they support, the uniform resource locators (URLs), application-server modules, and databases each belonged to one enterprise application only, while the file system 112 supported both enterprise applications. Hence, separating the file system required further analysis (for example, into individual mount points or even directories or files supporting the different databases b 140 and a and c 136 and 142, respectively).

In one or more embodiments of the invention, this can be performed using, for example, the technologies for module-level dependency discovery detailed herein. Also note that this type of unstacking requires duplicating the outer levels of software components (that is, there are two web servers, two application server installations, etc. now, and also the application server A 124 and the database instance 138 have been duplicated, while application server B 130 and database instance 134 were only needed in the grey enterprise application).

Figure 4:
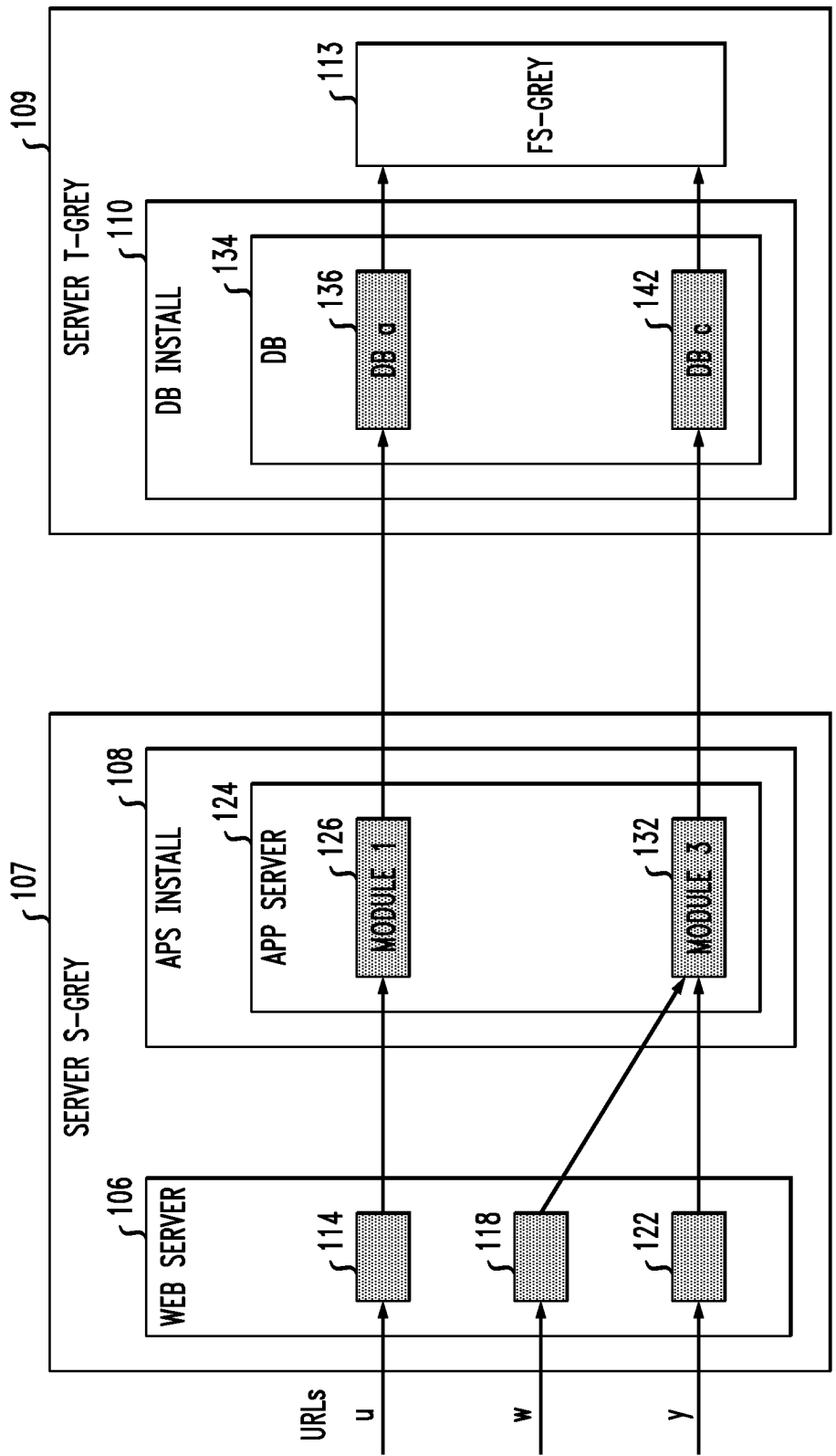
FIG. 4 shows an example of unstacking options, according to one or more embodiments of the invention.

FIG. 4 depicts an example of further simplification of the software components for the grey enterprise application (that is, extending the design from FIG. 3). Here, Module 1 and Module 3, numbered 126 and 132, are moved into the same application server instance A 124, and the databases a 136 and c 142 are moved into the same DB instance 134. This can be referred to as stacking rather than unstacking, but may be considered as an option at the same time if the goal is simple standardized images. By way of example and not limitation, in such an instance as described above, settings in App server A 124 and DB instance 134 may need to be compared with those of former App ServerB 130 and DB instance 138, respectively and/or changed to accommodate additional modules. By way of example, such settings can include server and instance owners, ports on which the software listens for connections, backup schedules of the databases, etc. If they are not the same initially, standardization may be desired; in particular as it is known that they belong to the same enterprise application now.

Figure 5:
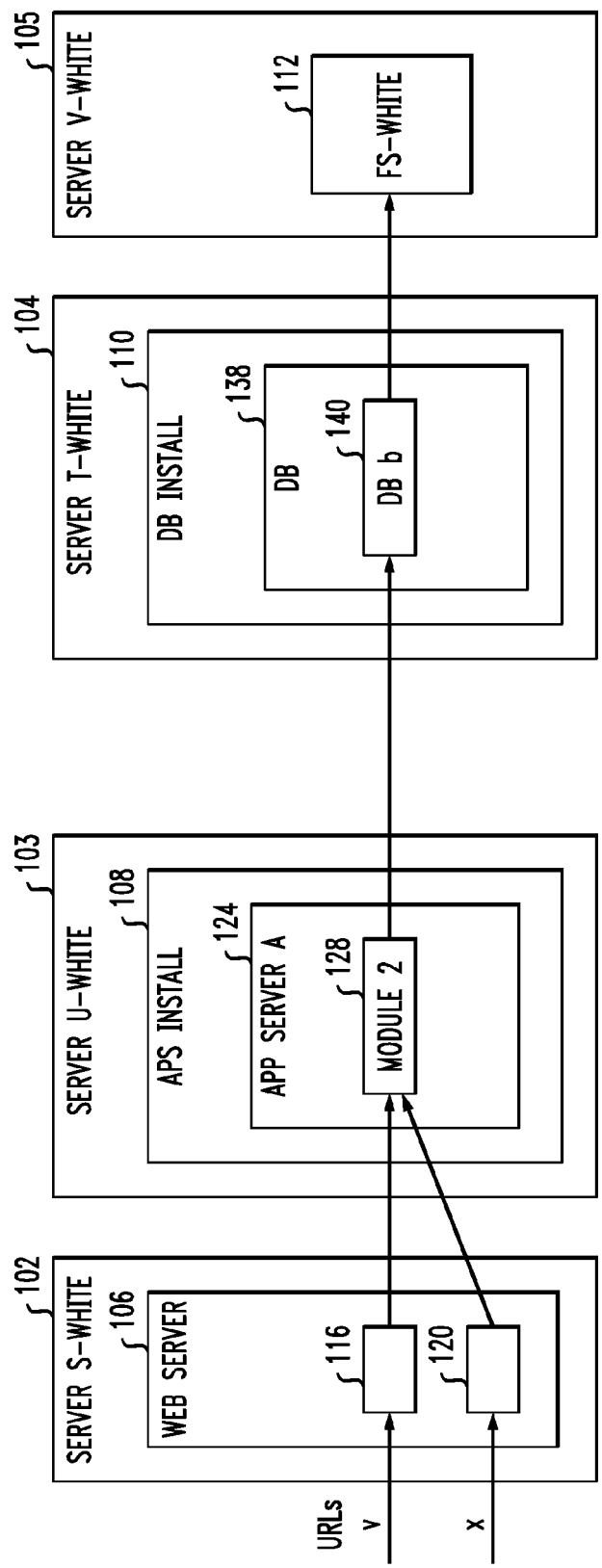
FIG. 5 shows an example of unstacking options, according to one or more embodiments of the invention.

FIG. 5 depicts an example of unstacking along both the dimension of software components and the dimension of enterprise applications, here for the "white" enterprise application. Note that after the unstacking, if the resulting servers are virtual, some of them may still be placed on the same physical servers according, for example, to their resource consumption. Placing virtual images on physical servers by their resource consumption includes techniques that should be known to one skilled in the art.

Figure 6:
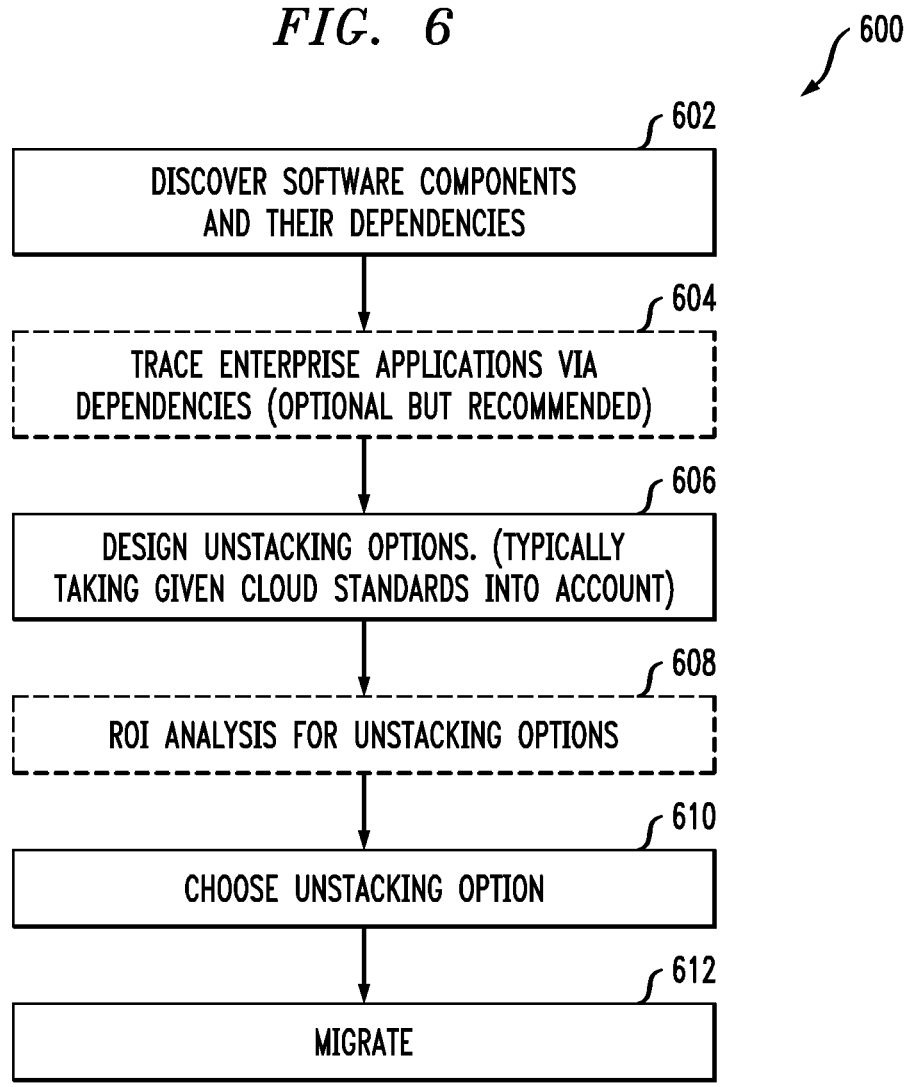
FIG. 6 shows a flow chart of exemplary method steps, according to an aspect of the invention.

Reference should now be had to FIG. 6, which presents a flow chart 600 of exemplary method steps, according to an aspect of the invention. In step 602, discover one or more software components as well as their dependencies. FIG. 1 is an example of the result of such a discovery in a graphical form, corresponding closely to actual results that can be produced with module-level dependency discovery as described herein, except that there would be no distinction of different enterprise applications, such as the white and the grey ones in FIG. 1, after this step. One or more embodiments of the invention can include using a module-level automated discovery tool (as described herein) for this step because software components and their dependencies are very rarely known at this level of detail in enterprises.

Also, the plurality of software components can include, for example, an installation component, wherein the installation component includes executable code of a product as installed on at least one of an image and a physical server. Also, the software components can include a service component, for example, an application server component and/or a database instance component, wherein those components comprise running code and typically listen for connections from other software components. A services component must belong to an installation component. The software components can additionally include one or more individually manageable components inside the service components; for example, individual applications in an application server component or individual databases in a database instance component.

The graphical form of output is only one example; for the automation of the following steps, there can also be an output format better suitable to automated processing, such as, for example, a component-and-dependency database or an extensible markup language (XML) file containing the components and their dependencies. This data structure will contain both the relation shown as box inclusions in FIG. 1, corresponding to one software component being implemented in an environment or on an abstraction provided by another software component (such as a module in the environment of an application server), and those shown by arrows which typically correspond to interaction.

With regard to dependencies, note that, typically, programs can be obtained by assembling various components at runtime. Dependencies refer to the external resources on which a program may depend. As used herein, "external resources" are defined as any resources available outside of a given program that a program reads, looks up, interacts with, or writes to during its operation.

In optional but preferred step 604, trace enterprise applications via the dependencies discovered in step 602. In this case, the first and second enterprise applications as mentioned above (for example, "white" and "grey" in the figures) would be traced. This can be needed, for example, because it is not known in advance which software components belong to which enterprise application. In particular, when enterprise applications share servers or software components, the details of what belongs to what are rarely fully documented. Typically, however, at least something about the enterprise applications is known, in particular how users interact with them. Thus, in the example of FIG. 1, it is typically known which URLs belong to which enterprise applications. Here u, w, and y belong to the grey application and v, x belong to the white application.

From there on, following the directed graph of dependencies can yield all other components that contribute to this enterprise application. For instance, following the dependency from URL u 114, one sees that Module 1, numbered 126, belongs to the grey enterprise application, and next following the dependency from Module 1, numbered 126, shows that database a 136 also belongs to the grey enterprise application. Algorithms for such tracing of dependencies in graphs (also referred to as transitive closure) are known by one skilled in the art.

Additional details for a special case where dependencies can be defined at different levels of component inclusion are described in Joukov et al., ITBVM: IT Business Value Modeler; IEEE International Conference on Services Computing (SCC 2009), Bangalore, September 2009. This aspect is not shown in FIG. 1, but, for example, the dependency of Module 3, numbered 132, to database c 142, might actually be defined on Application server B 130. If, similarly, the dependencies of Module 1 and Module 2 were defined as configurations of application Server A 124, then this technique would not be able to separate that database a 136 is only used in the grey enterprise application while database b is only used in the white enterprise application (thus allowing unstacking of them as show in FIG. 3). In this case, a more detailed code analysis can be used on these modules to determine which of them uses which of the configurations of the application server A and, thus, ultimately, which of the databases a and b. Additional details for these techniques can be found, for example, in U.S. patent application Ser. No. 12/511,506, filed Jul. 29, 2009, and U.S. patent application Ser. No. 12/553,486, filed Sep. 3, 2009.

Step 606 includes designing one or more unstacking options. One example option is unstacking along the dimension of key software components as exemplified in FIG. 2, in particular if a benefit sought is more uniform images, simpler management, or migration to cloud. One or more embodiments of the invention include considering all software installations on the images that were analyzed (all boxes in the example figures that are directly inside a Server box), and classifying them into "key software component" and others. This classification can be performed in advance. For example, one or more embodiments of the invention include classifying all database installations, application servers, web servers, and packaged applications as "key software components," while compilers, script interpreters, browsers, office software, and infrastructure management applications such as storage management agents, virus checkers, and the like are classified as "non-key."

Additionally, an example unstacking option includes splitting up the plurality of software components such that each image serves only one enterprise application. Another example unstacking option can include splitting up the plurality of software components such that each image contains only one key software component and/or a set of two or more key software components as the two or more key software components exist on a cloud image. An example unstacking option can also include splitting up the plurality of software components and duplicating one or more of the plurality of software components. Further, another example unstacking option can include joining one or more software components after an initial splitting up of the plurality of software components. Yet another example unstacking option includes splitting up data in a database according to affinity of the data to an enterprise application.

In a case wherein an image contains a software installation that has not been pre-classified, a user interface may show it and ask the user to input the classification. The design can contain one image per key software installation identified (such as the four servers 102 to 105 in FIG. 2). As to the non-key software, one or more embodiments of the invention can include replicating the non-key software on each image, as it may play general helper roles on each image. If an installation type is identified as non-key, but it is part of the software components whose dependencies can be tracked in detail, then this software might also be distributed with the key software it serves. For instance, if file systems were not classified as key software components, and one file system was used by multiple key software components, then detailed tracing of dependencies to mount points might show what parts of this file system would go on the same server as each of these key software components.

If a goal includes migration to cloud, then the detailed design for unstacking along the dimension of key software components will be strongly influenced by images that the cloud offers. By way of example, this can include platform-as-a-service clouds, where images with certain software installations are available in an image catalogue. For instance, if the cloud catalogue contains an image with a web server alone and an image with an application server alone, then unstacking the web server 106 and the APS install 108 onto two different images, as in FIG. 2, enables one to use these cloud images without installing additional key software on them. Also, for example, installing additional key software may even be disallowed by cloud management standards in certain enterprise environments.

Another unstacking design option is along the dimension of enterprise applications, as shown in FIG. 3. This is a typical design option, for example, if a goal includes separating enterprise applications for company split-up or for simpler accounting, auditing, security management, and the like. As described herein (for example, in the description of FIG. 3), a design method can be to separate software components at the first level of granularity where each component only serves one enterprise application, and to replicate containing software components if they contained inner software components from more than one enterprise application. While FIG. 3 depicts an example where URLs, modules, and databases were the first level of granularity that serves only one enterprise application, it is to be appreciated that there can be other situations. For instance, it may turn out that an entire web server, or application server, or database instance, or even application server install or database install is only used by one enterprise application.

Additionally, in many cases, this procedure can sufficiently separate the enterprise applications. In particular, it may be rare that one application server module serves several enterprise applications (for example, because during the design phase of an enterprise application, one will try to keep its modules separate, precisely for modularity). Common databases, however, may be more common (for example, an employee or customer database). If discovery at the finest available level of detail (for example, database tables) of the primary discovery tool does not separate this software component (for example, some or all tables are used by more than one enterprise application), one design option of one or more embodiments of the invention can include leaving this specific software component as a joint component.

In situations where a reason for unstacking includes simpler accounting or security management or the like, one or more embodiments of the invention can still achieve significant advantages by unstacking the other software components. This unstacking of the other software components can also assist in achieving the same goals on the database, because usage and access will be easier to trace when the accessing applications are well distinguished. By way of example and not limitation, one or more embodiments of the invention can include duplicating the component (for example, if one of the enterprise applications only reads the data, it might get a read-only replica of the database, or if a company splits up, both parts may, from now on, get independent customer databases, both initialized with the content of the current customer database).

In yet other cases, one or more additional embodiments of the invention can include separating a database by rows (for example, when splitting up an employee database for a company split-up). This can require analysis of which employees belong to which new company, which will typically be possible, for example, via a SELECT-query on the current owning enterprise units, which is likely to be a column in a table of the same employee database.

In the outer software components that get replicated (such as App server A 124 and DB instance 138 in FIG. 3), one or more embodiments of the invention can include attempting to reduce or split configuration settings, corresponding to the fewer contained software components after the unstacking, in particular if any resource reservations are made at that level and individual resource needs of contained components are known. Another change to plan can include, for example, that of owners and users, if they are configured at that level, and if the unstacking is done for reasons of stricter security, auditing and the like or for a split-up of companies.

Optional step 608 includes carrying out a quantitative analysis (for example, a return-on-investment (ROI) analysis) to compare the unstacking options. This step can include evaluating the costs of the various designs. In one or more embodiments of the invention, this can be carried out for a larger set of images and applications together, because certain costs, like software management costs, can have economies of scale. The costs that may be considered can include, for example, the cost for hosting the resulting images (for example, somewhat more storage will be needed if outer software components are duplicated), costs for cloud images if those can be used, costs of software licenses (depending on the number of installations and other factors prescribed in the vendors' licensing terms), costs of software management (depending on the number of different types of software as well as the number of components), and transformation costs (that is, the costs to produce the designed new images). Also, in one or more embodiments of the invention, the transformation costs are initially estimated, and subsequently are based on statistics of prior unstacking projects.

Step 610 includes choosing an appropriate one of the unstacking options designed in step 606. By way of example, if a goal includes separation of enterprise applications, one will only choose (and possibly only make in the first place) designs that do indeed separate enterprise applications (for example, the designs depicted in FIGS. 3, 4, and 5, but not the design shown in FIG. 2). If a quantitative analysis, such as an ROI analysis, has been performed in step 608, then one or more embodiments of the invention can include, for example, choosing the design with the lowest cost; in one or more embodiments of the invention, this can be done automatically. In one or more additional embodiments of the invention, this step can include a qualitative estimation, for example, based on how many different images one gets with various unstacking options if a goal includes management simplicity; in one or more embodiments of the invention, such choices can also be automated (for example, as a rule-based decision system).

Step 612 includes migrating the computer system of interest to the new, unstacked configuration selected in step 610. Depending on the software components and whether entire software installations are migrated, or individual applications, database instances and the like, or even individual URLs, modules, and databases and the like, various techniques can be used to aid in this step. By way of example and not limitation, a vendor may provide tools to migrate entire product installations from one image or server to another. In other cases, binary migration of the product and its data is possible. In yet other cases, special migration tools, such as those described, for example, in U.S. patent application Ser. No. 12/608,609, filed Oct. 29, 2009, can be used.

Figure 7:
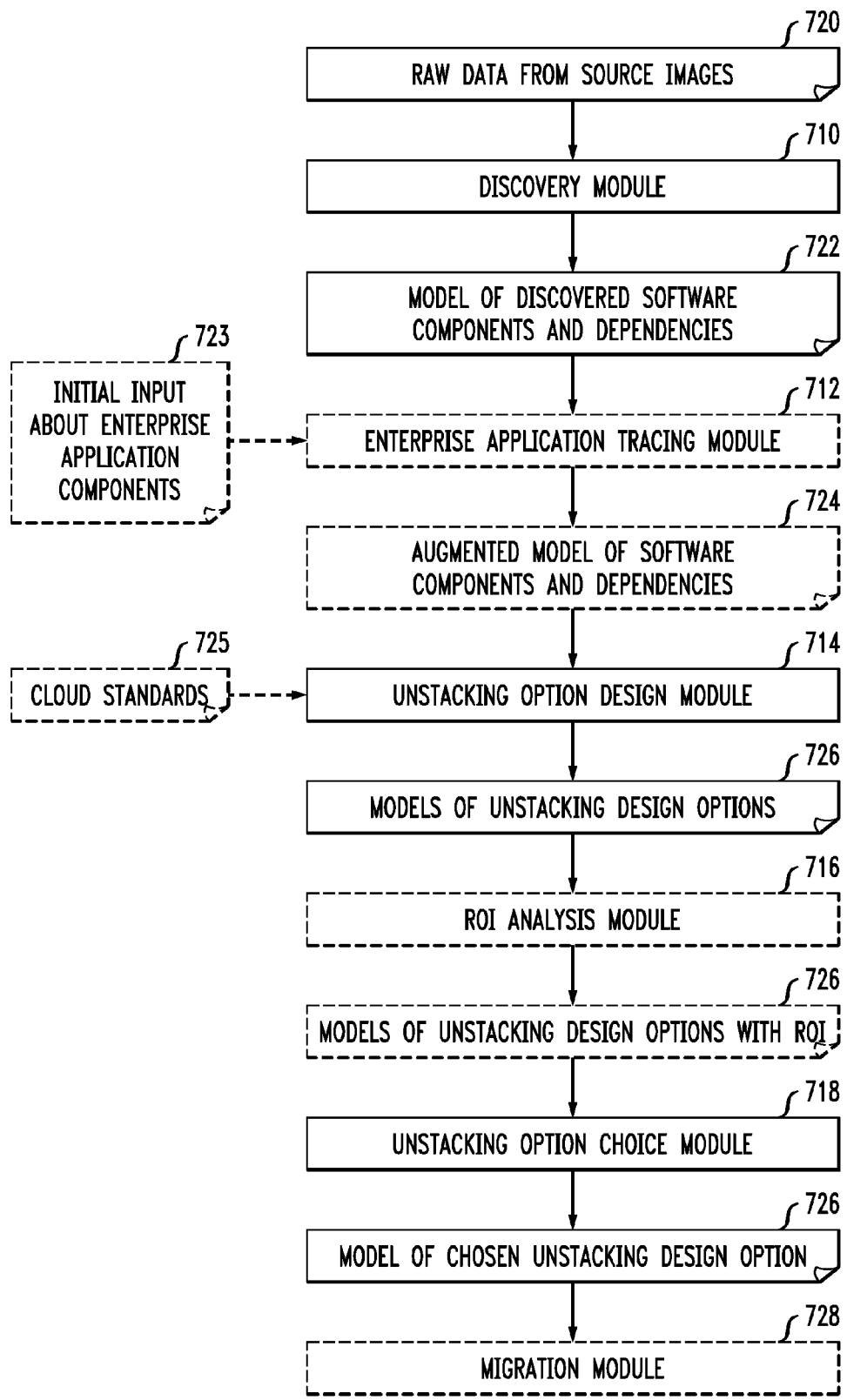
FIG. 7 is a block diagram illustrating an exemplary embodiment, according to an aspect of the invention.

FIG. 7 is a block diagram illustrating an example embodiment, according to an aspect of the invention. In conjunction with the techniques described herein, FIG. 7 depicts software modules used to carry out one or more embodiments of the invention. By way of illustration, raw data 720 is obtained from source images and provided to discovery module 710 to generate a model of discovered software components and dependencies 722. The model, as well as initial input about enterprise application components 723, is provided to an enterprise application tracing module 712 to generate an augmented model of software components and dependencies 724. The augmented model, as well as cloud standards 725, is provided to an unstacking option design module 714 to generate models of unstacking design options 726.

The models of unstacking design options are provided to an ROI analysis module 716 to generate models of unstacking design options with ROI 726, which are then provided to an unstacking option choice module 718. From module 718, a model of a chosen unstacking design option 726 is provided to a migration module 728.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
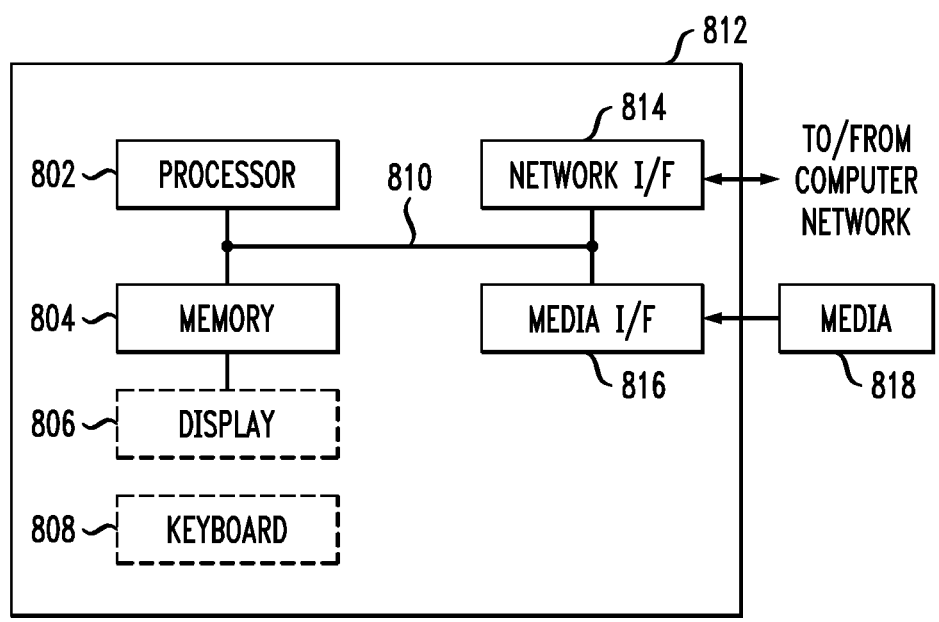
FIG. 8 depicts a computer system that may be useful in implementing one or more aspects and/or elements of the invention.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard. A virtual server running on a physical server will be designated as such.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. One or more embodiments preferably employ a scripting language such as Perl. Furthermore, in addition to object oriented and procedural languages, some embodiments might employ functional languages (for example, Lisp, ML) and/or logical languages (for example, Prolog). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagram(s) in the Figures illustrate the architecture, functionality, and operation of possible implementations of systems, methods and computer program products according to various embodiments of the present invention. In this regard, in general, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the diagrams and corresponding descriptions herein; by way of example and not limitation, a discovery module, an unstacking design module that prepares unstacking options according to multiple criteria, and a selection module that selects among the unstacking options. The method steps can then be carried out using the distinct software modules and/or sub-modules of the system, as described above, executing on one or more hardware processors 802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for unstacking software components, the method comprising:
    discovering a stacked plurality of software components and one or more dependencies between the plurality of software components in a computer system;
    designing a plurality of unstacking options for unstacking said stacked plurality of software components;
    performing a quantitative analysis to compare said plurality of unstacking options, wherein said quantitative analysis comprises a return on investment analysis based on an evaluation of a plurality of costs associated with each of said plurality of unstacking options, wherein said plurality of costs comprise (i) a cost for hosting one or more resulting images, (ii) a cost for one or more cloud images, (iii) a cost of one or more software licenses, (iv) a cost of software management, and (v) a cost to produce a designed new image;
    selecting one of said unstacking options to unstack said stacked plurality of software components based on said quantitative analysis performed on said plurality of unstacking options; and
    unstacking said stacked plurality of software components via said selected unstacking option, wherein said unstacking comprises (i) separating said stacked plurality of software components from one operating system image in the computer system and (ii) positioning multiple subsets of one or more of the plurality of software components on different physical and/or virtual machines.

2. The method of claim 1, wherein the plurality of software components comprises an installation component, wherein the installation component comprises executable code of a product as installed on at least one of an image and a physical server.

3. The method of claim 1, wherein the plurality of software components comprises a service component, wherein the service component comprises at least one of running code and listening for one or more connections from one or more other software components.

4. The method of claim 1, wherein the plurality of software components comprises one or more individually manageable components inside one or more service components.

5. The method of claim 1, further comprising migrating said computer system in accordance with said given one of said unstacking options.

6. The method of claim 1, wherein said unstacking options are designed taking into account at least one cloud computing standard.

7. The method of claim 1, further comprising tracing a plurality of enterprise applications via said dependencies, wherein said designing step takes said enterprise applications into account.

8. The method of claim 1, wherein one unstacking option comprises splitting up the plurality of software components such that each of a plurality of images serves only one enterprise application.

9. The method of claim 1, wherein one unstacking option comprises splitting up the plurality of software components such that each of a plurality of images contains at least one of only one key software component and a set of two or more key software components as the two or more key software components exist on a cloud image.

10. The method of claim 1, wherein one unstacking option comprises splitting up the plurality of software components and duplicating one or more of the plurality of software components.

11. The method of claim 1, wherein one unstacking option comprises joining one or more software components after an initial splitting up of the plurality of software components.

12. The method of claim 1, wherein one unstacking option comprises splitting up data in a database according to affinity of the data to an enterprise application.

13. The method of claim 1, further comprising providing a system, wherein said system comprises distinct software modules, each of said distinct software modules being embodied on a computer-readable storage medium, and wherein said distinct software modules comprise a discovery module, an unstacking design module and a selection module;
wherein:
said discovering a plurality of software components and one or more dependencies between the software components in a computer system step is carried out by said discovery module executing on at least one hardware processor;
said designing a plurality of unstacking options for unstacking said components step is carried out by said unstacking design module executing on at least one hardware processor; and
said selecting a given one of said unstacking options step is carried out by said selection module executing on said at least one hardware processor.

14. A computer program product comprising a tangible computer readable recordable storage medium including computer useable program code for unstacking software components, the computer program product including:
computer useable program code for discovering a plurality of software components and one or more dependencies between the software components in a computer system;
computer useable program code for designing a plurality of unstacking options for unstacking said components;
computer useable program code for performing a quantitative analysis to compare said plurality of unstacking options, wherein said quantitative analysis is comprises a return on investment analysis based on an evaluation of a plurality of costs associated with each of said plurality of unstacking options, wherein said plurality of costs comprise (i) a cost for hosting one or more resulting images, (ii) a cost for one or more cloud images, (iii) a cost of one or more software licenses, (iv) a cost of software management, and (v) a cost to produce a designed new image;
computer useable program code for selecting one of said unstacking options to unstack said components based on said quantitative analysis performed on said plurality of unstacking options; and
computer useable program code for unstacking said stacked plurality of software components via said selected unstacking option, wherein said unstacking comprises (i) separating said stacked plurality of software components from one operating system image in the computer system and (ii) positioning multiple subsets of one or more of the plurality of software components on different physical and/or virtual machines.

15. The computer program product of claim 14, further comprising computer useable program code for migrating said computer system in accordance with said given one of said unstacking options.

16. The computer program product of claim 14, wherein the unstacking options comprises at least one of:
splitting up the plurality of software components such that each of a plurality of images serves only one enterprise application;
splitting up the plurality of software components such that each of a plurality of images contains at least one of only one key software component and a set of two or more key software components as the two or more key software components exist on a cloud image;
splitting up the plurality of software components and duplicating one or more of the plurality of software components;
joining one or more software components after an initial splitting up of the plurality of software components; and
splitting up data in a database according to affinity of the data to an enterprise application.

17. A system for unstacking software components, comprising:
a memory; and
at least one processor coupled to the memory and operative to:
discover a plurality of software components and one or more dependencies between the software components in a computer system;
design a plurality of unstacking options for unstacking said components;
perform a quantitative analysis to compare said plurality of unstacking options, wherein said quantitative analysis comprises a return on investment analysis based on an evaluation of a plurality of costs associated with each of said plurality of unstacking options, wherein said plurality of costs comprise (i) a cost for hosting one or more resulting images, (ii) a cost for one or more cloud images, (iii) a cost of one or more software licenses, (iv) a cost of software management, and (v) a cost to produce a designed new image;
select one of said unstacking options to unstack said components based on said quantitative analysis performed on said plurality of unstacking options; and
unstack said stacked plurality of software components via said selected unstacking option, wherein said unstacking comprises (i) separating said stacked plurality of software components from one operating system image in the computer system and (ii) positioning multiple subsets of one or more of the plurality of software components on different physical and/or virtual machines.

18. The system of claim 17, wherein the at least one processor coupled to the memory is further operative to migrate said computer system in accordance with said given one of said unstacking options.

19. The system of claim 17, wherein the unstacking options comprises at least one of:
- splitting up the plurality of software components such that each of a plurality of images serves only one enterprise application;
- splitting up the plurality of software components such that each of a plurality of images contains at least one of only one key software component and a set of two or more key software components as the two or more key software components exist on a cloud image;
- splitting up the plurality of software components and duplicating one or more of the plurality of software components;
- joining one or more software components after an initial splitting up of the plurality of software components; and
- splitting up data in a database according to affinity of the data to an enterprise application.

* * * * *